(12) United States Patent
Koonankeil et al.

(10) Patent No.: US 11,149,548 B2
(45) Date of Patent: Oct. 19, 2021

(54) METHOD OF REDUCING MANUFACTURING VARIATION RELATED TO BLOCKED COOLING HOLES

(71) Applicant: United Technologies Corporation, Hartford, CT (US)

(72) Inventors: James M. Koonankeil, Marlborough, CT (US); Edward F Pietraszkiewicz, Southington, CT (US); Francis M Tamiso, Manchester, CT (US); Kirk D Hlavaty, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1180 days.

(21) Appl. No.: 14/522,656

(22) Filed: Oct. 24, 2014

(65) Prior Publication Data

US 2015/0300201 A1 Oct. 22, 2015

Related U.S. Application Data

(60) Provisional application No. 61/903,447, filed on Nov. 13, 2013.

(51) Int. Cl.
| | |
|---|---|
| *F01D 5/14* | (2006.01) |
| *F01D 11/00* | (2006.01) |
| *F01D 5/18* | (2006.01) |
| *F01D 11/08* | (2006.01) |
| *F01D 9/06* | (2006.01) |

(52) U.S. Cl.
CPC ............ *F01D 5/141* (2013.01); *F01D 5/186* (2013.01); *F01D 5/187* (2013.01); *F01D 5/188* (2013.01); *F01D 9/065* (2013.01); *F01D 11/00* (2013.01); *F01D 11/003* (2013.01); *F01D 11/08* (2013.01); *F05D 2240/126* (2013.01); *F05D 2240/127* (2013.01); *F05D 2260/2212* (2013.01);
(Continued)

(58) Field of Classification Search
CPC .......... F01D 5/186; F01D 5/187; F01D 5/188; F01D 9/065; F01D 11/00; F01D 11/08; F05D 2240/126; F05D 2240/127; F05D 2260/2212; F05D 2260/20; F05D 2260/202; F05D 2260/22141; Y10T 29/49341
USPC .......... 415/115, 116, 173.1; 416/96 R, 96 A, 416/97 R
See application file for complete search history.

(56) References Cited

U.S. PATENT DOCUMENTS

| | | | | |
|---|---|---|---|---|
| 4,514,144 A | * | 4/1985 | Lee | B22C 9/04 416/96 R |
| 4,767,268 A | * | 8/1988 | Auxier | F01D 5/187 415/115 |

(Continued)

*Primary Examiner* — Christopher Verdier
(74) *Attorney, Agent, or Firm* — Carlson, Gaskey & Olds, P.C.

(57) ABSTRACT

A cooling circuit for a gas turbine engine includes a gas turbine engine component having at least one internal cooling cavity defined by an internal wall surface and a plurality of turbulent flow features extending outwardly from the internal wall surface. Each turbulent flow feature is spaced apart from an adjacent turbulent flow feature in a first direction. At least one trench extends through the turbulent flow features in the first direction, and a plurality of cooling holes are formed within the at least one trench. A gas turbine engine and a method of forming a cooling circuit for a gas turbine engine component are also disclosed.

28 Claims, 4 Drawing Sheets

(52) U.S. Cl.
CPC ..... *F05D 2260/22141* (2013.01); *Y02T 50/60* (2013.01); *Y10T 29/49341* (2015.01)

(56) References Cited

U.S. PATENT DOCUMENTS

| | | |
|---|---|---|
| 4,775,296 A | 10/1988 | Schwarzmann et al. |
| 5,352,091 A | 10/1994 | Sylvestro |
| 5,700,131 A | 12/1997 | Hall et al. |
| 7,195,448 B2 | 3/2007 | Levine et al. |
| 7,452,186 B2 | 11/2008 | Charbonneau et al. |
| 8,109,726 B2 | 2/2012 | Liang |
| 8,210,812 B2 | 7/2012 | Abdel-Messeh et al. |
| 8,317,475 B1 | 11/2012 | Downs |
| 8,328,518 B2 | 12/2012 | Liang et al. |
| 2006/0210399 A1* | 9/2006 | Kitamura ................ F01D 5/186 416/97 R |
| 2007/0189897 A1* | 8/2007 | Pietraszkiewicz ...... F01D 5/186 416/97 R |
| 2008/0079523 A1* | 4/2008 | Tholen ..................... B22C 9/04 336/60 |
| 2009/0041587 A1 | 2/2009 | Konter et al. |
| 2012/0328450 A1 | 12/2012 | Spangler et al. |
| 2016/0017806 A1* | 1/2016 | Mongillo ................ F01D 5/186 60/772 |

\* cited by examiner

METHOD OF REDUCING MANUFACTURING VARIATION RELATED TO BLOCKED COOLING HOLES

CROSS-REFERENCE TO RELATED APPLICATION

This application claims priority to U.S. Provisional Application No. 61/903,447, filed Nov. 13, 2013.

BACKGROUND OF THE INVENTION

In pursuit of higher engine efficiencies, higher turbine inlet temperatures have been relied upon to boost overall engine performance. This can result in gas path temperatures that may exceed melting points of turbine component materials. To address this issue, dedicated cooling air is extracted from a compressor section and is used to cool the gas path components in the turbine, such as rotating blades and stator vanes for example.

One method of cooling turbine airfoils utilizes internal cooling passages. Typically, film cooling holes and significant volumes of cooling air are required to provide the needed amount of cooling. To augment the internal cooling, the internal cooling passages in some airfoils have been configured to include treatments such as trip strips formed on passage walls.

Turbine airfoil cooling holes are typically drilled through internal cavity walls of the airfoil that form the cooling passages. One method of drilling these holes utilizes a shaped electrode that has a shaped diffuser portion and a round metering portion in a single electrode tool. This type of tool must have a fixed tooth length to machine the round metering portion of the cooling hole. The length of the tooth is determined based on the nominal wall thickness of a casting of the airfoil in the location where the holes are to be installed. However, this nominal wall thickness does not account for the presence of, and interference with, trip strips that are formed as part of the wall of the internal cavity. The cause of this interference is that the internal trip strip spacing differs from the cooling hole spacing due to differing functional requirements. When an electrode tooth encounters a trip strip during drilling, the electrode must drill through additional material which wears down the tooth and can result in an insufficient remaining tooth length to finish drilling the cooling hole. As a result of this trip strip interference, cooling holes are often blocked.

SUMMARY OF THE INVENTION

In a featured embodiment, a cooling circuit for a gas turbine engine includes a gas turbine engine component having at least one internal cooling cavity defined by an internal wall surface and a plurality of turbulent flow features extending outwardly from the internal wall surface. Each turbulent flow feature is spaced apart from an adjacent turbulent flow feature in a first direction. At least one trench extends through the turbulent flow features in the first direction, and a plurality of cooling holes are formed within the at least one trench.

In another embodiment according to the previous embodiment the at least one trench is co-planar with the internal wall surface.

In another embodiment according to any of the previous embodiments, each cooling hole is spaced apart from the plurality of turbulent flow features.

In another embodiment according to any of the previous embodiments, the plurality of cooling holes comprise film cooling holes that extend to a surface of the gas turbine engine component.

In another embodiment according to any of the previous embodiments, the at least one trench divides the plurality of turbulent flow features into a first sub-set of turbulent flow portions on one side of the trench and a second sub-set of turbulent flow portions on an opposite side of the trench.

In another embodiment according to any of the previous embodiments, a plurality of ribs is formed on the internal wall surface, and wherein one or more turbulent flow features of the plurality of turbulent flow features extends from one rib toward an adjacent rib in a second direction.

In another embodiment according to any of the previous embodiments, the turbulent flow features extend at an oblique angle relative to the ribs.

In another embodiment according to any of the previous embodiments, the gas turbine engine component comprises an airfoil or a blade outer air seal.

In another embodiment according to any of the previous embodiments, the plurality of turbulent flow features comprise trip strips.

In another exemplary embodiment, a gas turbine engine includes a compressor section, a combustor section downstream of the compressor section, and a turbine section downstream of the combustor section. The turbine section includes a component having at least one internal cooling cavity defined by an internal wall surface and a plurality of turbulent flow features that extend outwardly from the internal wall surface. Each turbulent flow feature is spaced apart from an adjacent turbulent flow feature in a first direction. At least one trench extends through the turbulent flow features in the first direction, and a plurality of cooling holes are formed within the trench.

In another embodiment according to any of the previous embodiments, the component comprises an airfoil or blade outer air seal.

In another embodiment according to any of the previous embodiments, each cooling hole is spaced apart from the plurality of turbulent flow features.

In another embodiment according to any of the previous embodiments, the plurality of cooling holes comprise film cooling holes that extend to a surface of the gas turbine engine component.

In another embodiment according to any of the previous embodiments, a plurality of ribs is formed on the internal wall surface, and wherein one or more turbulent flow features of the plurality of turbulent flow features extends from one rib toward an adjacent rib in a second direction.

In another embodiment according to any of the previous embodiments, the plurality of turbulent flow features comprise trip strips.

In another exemplary embodiment, a method of forming a cooling circuit for a gas turbine engine component includes forming at least one internal cooling cavity within the gas turbine engine component, the internal cooling cavity being defined by an internal wall surface, and forming a plurality of turbulent flow features to extend outwardly from the internal wall surface, with each turbulent flow feature being spaced apart from an adjacent turbulent flow feature in a first direction. Additional steps include forming at least one trench to extend through the turbulent flow features in the first direction, and forming a plurality of cooling holes within the trench.

In another embodiment according to any of the previous embodiments, at least the steps of forming the internal cooling cavity, forming the turbulent flow features, and forming the trench are performed using a casting process.

In another embodiment according to any of the previous embodiments, the step of forming the cooling holes is performed by a drilling process.

In another embodiment according to any of the previous embodiments, the steps of forming the internal cooling cavity, forming the turbulent flow features, and forming the trench are performed using a casting process, and the step of forming the cooling holes is performed by a drilling process.

In another embodiment according to any of the previous embodiments, the gas turbine engine component comprises an airfoil or blade outer air seal.

The foregoing features and elements may be combined in any combination without exclusivity, unless expressly indicated otherwise.

These and other features may be best understood from the following drawings and specification.

DETAILED DESCRIPTION

Figure 1:
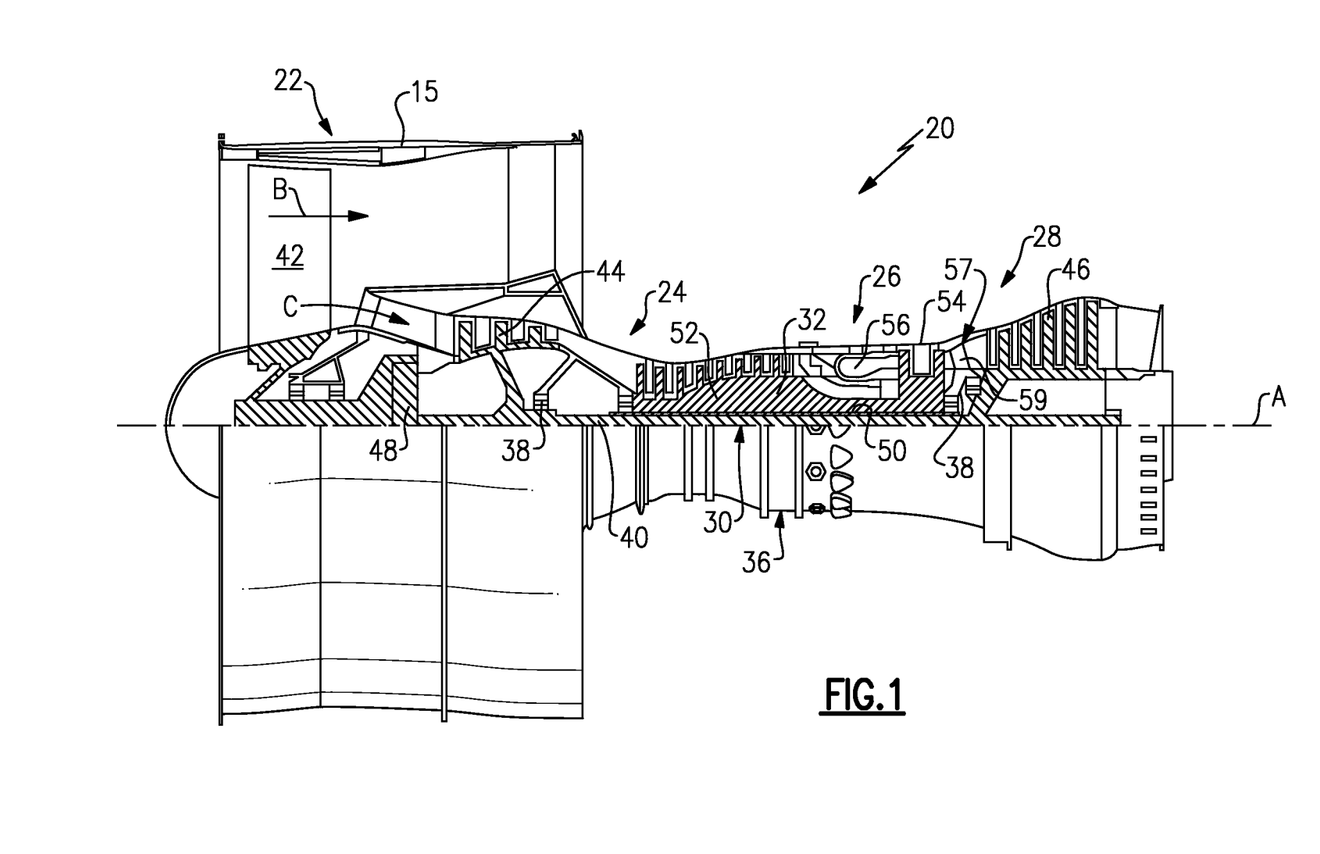
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second.

Figure 2:
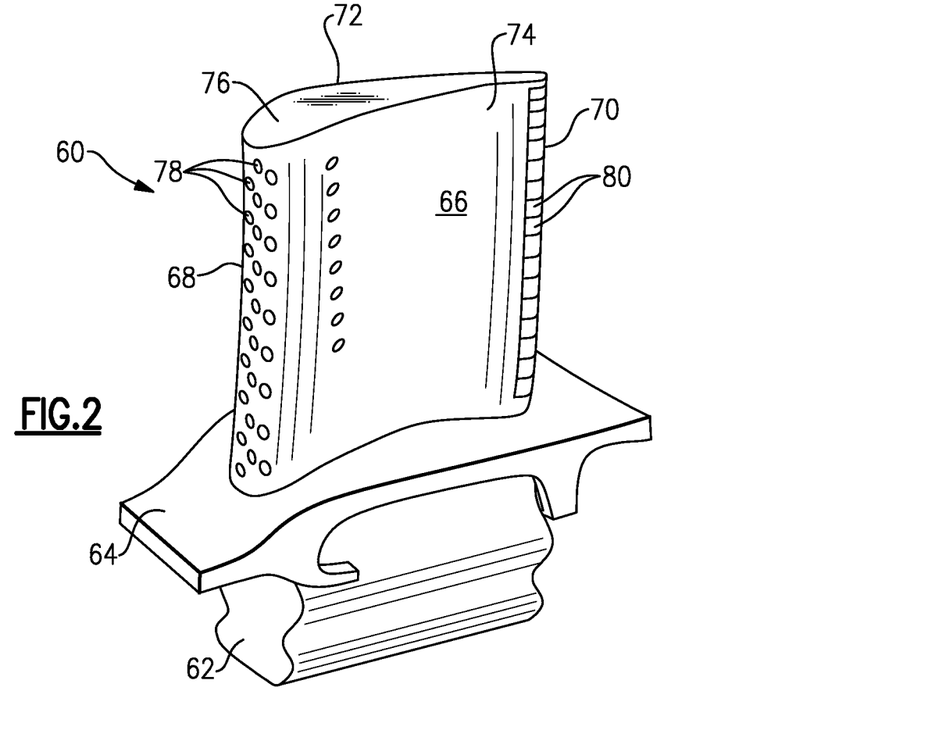
FIG. 2 is a side perspective view of a turbine blade.

Airfoils located downstream of combustor section 26, such as stator vanes and rotor blades in the turbine section 28, for example, operate in a high-temperature environment. Airfoils that are exposed to high temperatures typically include cooling circuits with internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of the airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 3:
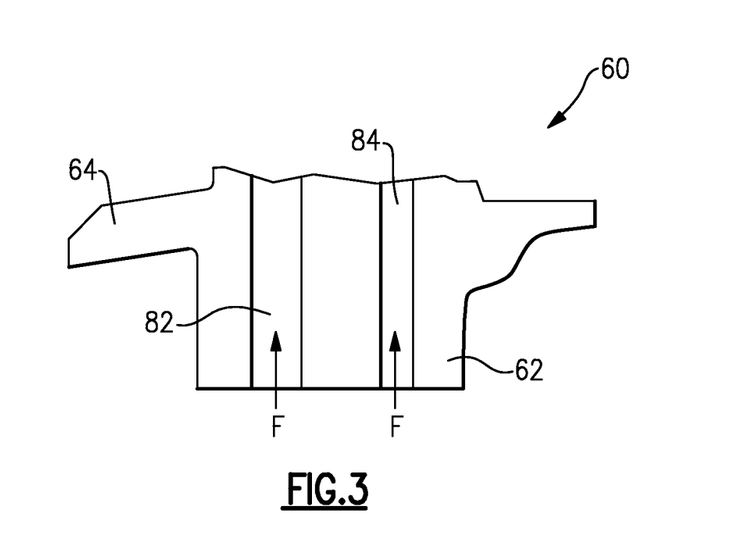
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80.

Figure 4:
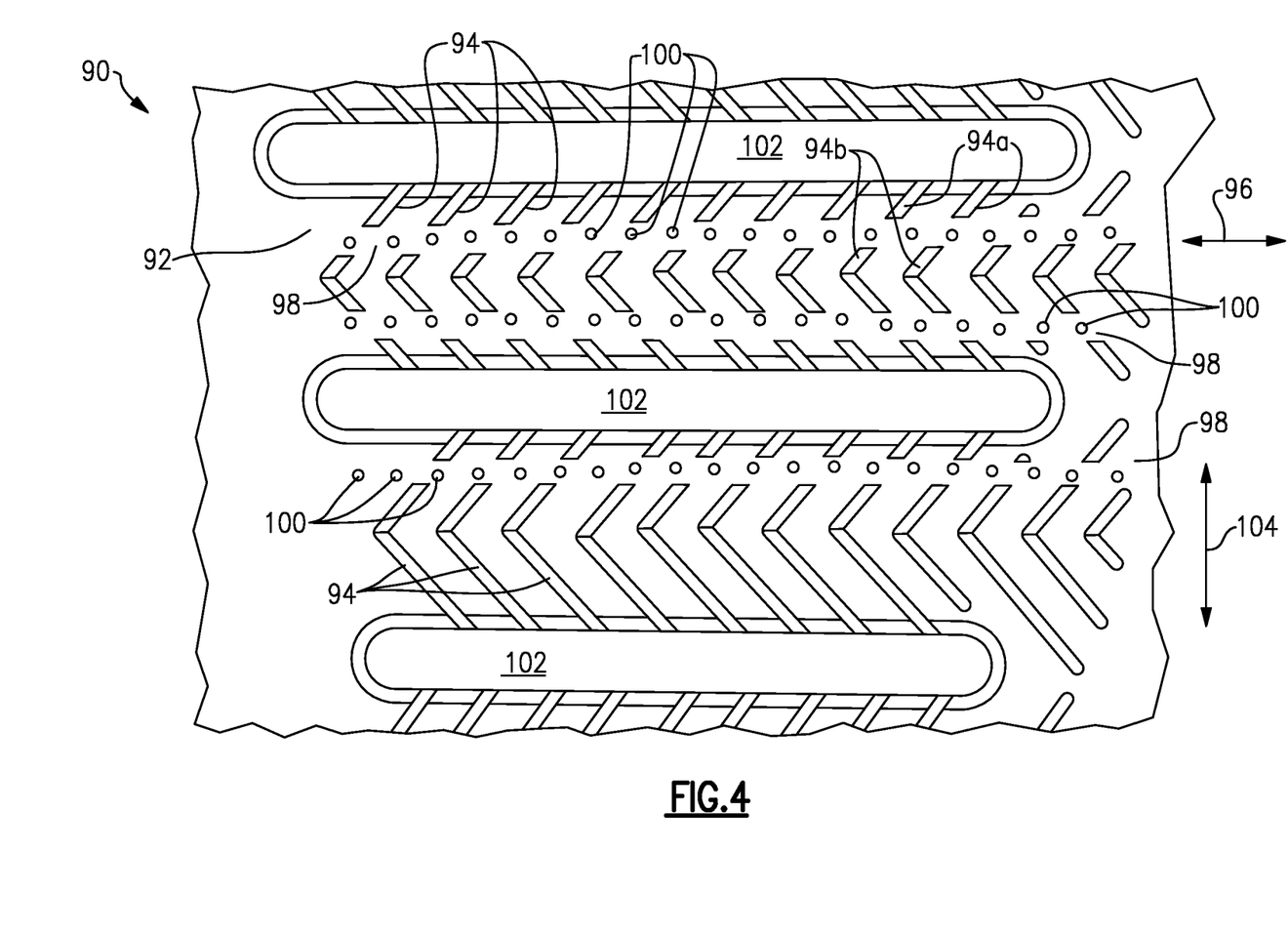
FIG. 4 is a view of an internal cooling cavity of the airfoil section of the blade of FIG. 2.

FIG. 4 shows an example of a portion 90 of one of the internal cooling channels 82, 84. The portion 90 of the cooling channel is defined by an internal wall surface 92. A plurality of turbulent flow features, such as trip strips 94 for example, extend outwardly from the internal wall surface 92. Each trip strip 94 is axially spaced apart from an adjacent trip strip 94 in a first direction as indicated at 96. A trench 98 is formed to extend through the trip strips 94 in the first direction 96. A plurality of cooling holes 100 is formed within the trench 98. In the example shown, the cooling holes comprise film cooling holes that extend to an outer surface of the airfoil section 66.

In the example shown, the trench 98 is co-planar with the internal wall surface 92. The plurality of cooling holes 100 are aligned along the trench 98 such that the holes 100 are in a non-overlapping relationship with the trip strips 94 in a direction that corresponds to a height of the trip strips as shown at 104 in FIG. 4. As such, the trench 98 divides the plurality of trip strips 94 into a first sub-set of trip strip portions 94a on one side of the trench 98 and a second sub-set of trip strip portions 94b on an opposite side of the trench 98, with the cooling holes 100 being positioned between and spaced apart from the sub-sets 94a, 94b.

In one example, a plurality of ribs 102 is formed on the internal wall surface 92. One or more of the trip strips 104 extends from one rib 102 toward an adjacent rib 102 in a second direction as indicated at 104. In the example shown, the trip strips 94 are configured to have a chevron shape and extend at an oblique angle relative to the ribs 102. It should be understood that the trip strips 94 could have other shapes. Further, more than one trench 98 could be formed within a set of trip strips. The trench 98 could be generally centrally located within the trip strips 94 as shown in the upper portion of FIG. 4, or the trench 98 could be offset from a center of the trip strips 94 as shown in the lower portion of FIG. 4.

In one example, the trip trips 94 and any associated trenches 98 are cast into the airfoil section 66. Any of various casting methods can be used to form the trench 98 and trip strips 94. The cooling holes 100 are then drilled through the walls of the airfoil. In one example, an electrode drilling tool is used to drill the holes. Because the trench 98 is located to align with a cooling hole location area, the drilling process is easily accomplished without any interference with the trip strips 94.

Figure 5:
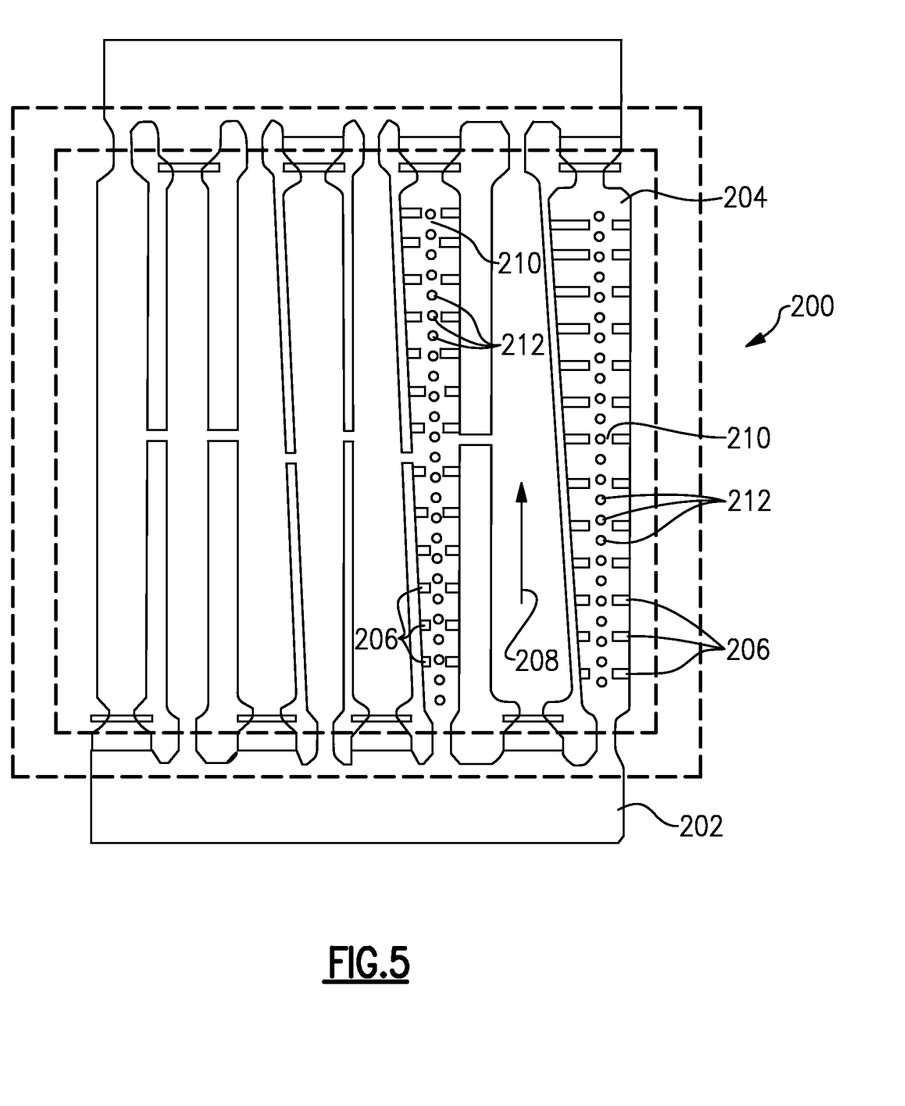
FIG. 5 shows an example of a blade outer air seal incorporating the subject invention.

FIG. 5 shows an example where a plurality of turbulent flow features are used in a blade outer air seal (BOAS) 200. The blade outer air seal 200 has a body portion 202 with a surface 204 that includes turbulent flow features such as trip strips 206, for example. The trip strips 206 extend outwardly from the surface 204 and each trip strip 206 is axially spaced apart from an adjacent trip strip 206 in a first direction as indicated at 208. A trench 210 is formed to extend through the trip strips 206 in the first direction 208.

In one example, a plurality of cooling holes 212 is formed within the trench 210 to facilitate cooling of the surface 204. In the example shown, the trench 210 is co-planar with the surface 204. The plurality of cooling holes 212 are aligned along the trench 210 such that the holes 212 are in a non-overlapping relationship with the trip strips 206 in a direction that corresponds to a height of the trip strips 206. In this example the plurality of turbulent flow features comprise trip strips 204; however, other flow features could also incorporate the subject invention.

The subject invention modifies trip strips 94 by installing a trench 98 through the trip strips 94 in a location that previously would have resulted in interference with the drilling of cooling holes 100. Thus, one benefit of this configuration is that a potential failure mode is addressed by eliminating the probability of a trip strip interfering with a cooling hole. This allows for a more consistent wall thickness to drill through, resulting in a more repeatable hole drilling process, yielding fewer blocked holes and more consistent hole diameters. Prior attempts to address this issue have focused on modifications to the manufacturing process such as lengthening the electrode tool tooth or performing a two-step process in which the meter hole is machined and then the shaped hole is machined in line with the meter hole. These methods are not as effective as the subject invention described above, and also there are limitations, such as back wall distances and line of sight during drilling, that in some cases make these alternatives not feasible.

The disclosed embodiments show different examples of trip strips and cooling holes as used in a turbine blade. This configuration could also be used in other components, such as vanes or blade outer air seals (BOAS) for example as shown in FIG. 5. Additionally, the turbulent flow features are shown as trip strips in the figures; however, it should be understood that other types of turbulent flow features that generate turbulent flows within internal passages could also be used.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cooling circuit for a gas turbine engine comprising:
a gas turbine engine component having at least one internal cooling channel that directs cooling flow in a desired direction, the at least one internal cooling channel defined by an internal wall surface;
a plurality of turbulent flow features extending outwardly from the internal wall surface, each turbulent flow feature being spaced apart from an adjacent turbulent flow feature in a first direction;
at least one trench extending through the turbulent flow features in the first direction to divide the plurality of turbulent flow features into a first sub-set of turbulent flow portions on one side of the trench and a second sub-set of turbulent flow portions spaced from the first sub-set of turbulent flow portions in a second direction and located on an opposite side of the trench;
a plurality of ribs extending outwardly from the internal wall surface, and wherein the turbulent flow features extend from one rib toward an adjacent rib in the second direction; and
a plurality of cooling holes formed within the at least one trench between the first and second sub-sets of turbulent flow portions in the second direction such that the cooling holes do not overlap with the turbulent flow features.

2. The cooling circuit according to claim 1 wherein the at least one trench is co-planar with the internal wall surface.

3. The cooling circuit according to claim 1 wherein the trench has a trench height extending in the first direction and a trench width extending in the second direction, and wherein each cooling hole is spaced apart from the plurality of turbulent flow features such that the cooling holes do not overlap with the turbulent flow features in the second direction.

4. The cooling circuit according to claim 1 wherein the plurality of cooling holes comprise film cooling holes that extend to a surface of the gas turbine engine component.

5. The cooling circuit according to claim 1 wherein the trench has a trench height extending in the first direction and a trench width extending in a second direction, and wherein the first sub-set of turbulent flow portions extend to a first set of distal ends and the second sub-set of turbulent flow portions extend to a second set of distal ends that face the first set of distal ends across the width of the trench, and wherein the cooling holes are positioned within the trench between the first and second sets of distal ends.

6. The cooling circuit according to claim 1 wherein the turbulent flow features extend at an oblique angle relative to the ribs.

7. The cooling circuit according to claim 1 wherein the gas turbine engine component comprises an airfoil or a blade outer air seal, and wherein the plurality of ribs comprise a plurality of discrete ribs that are spaced from each other across the internal wall surface, and wherein there is at least one trench between each pair of adjacent discrete ribs that divides the plurality of turbulent flow features into the first and second sub-sets of turbulent flow portions, and wherein each trench includes the cooling holes.

8. The cooling circuit according to claim 1 wherein the plurality of turbulent flow features comprise trip strips.

9. The cooling circuit according to claim 1 wherein the at least one trench is positioned closer to one of the ribs in the second direction than the other of the ribs.

10. The cooling circuit according to claim 1 wherein the at least one internal cooling channel comprises a plurality of internal cooling channels that are each defined by a respective internal surface, and wherein the internal surface of one of the internal cooling channels includes the plurality of ribs, the first and second sub-sets of turbulent flow portions, the at least one trench, and the plurality of cooling holes.

11. The cooling circuit according to claim 1 wherein the plurality of turbulent flow features comprise sets of turbulent flow features with each set including the first sub-set of turbulent flow portions and the second sub-set of turbulent flow portions, and wherein the ribs extend outwardly from the internal wall surface between adjacent sets of turbulent flow features.

12. A gas turbine engine comprising:
a compressor section;
a combustor section downstream of the compressor section; and
a turbine section downstream of the combustor section, and wherein the turbine section includes a component having
at least one internal cooling channel that directs cooling flow in a desired direction, the at least one internal cooling channel defined by an internal wall surface,
a plurality of turbulent flow features extending outwardly from the internal wall surface, each turbulent flow feature being spaced apart from an adjacent turbulent flow feature in a first direction,
at least one trench extending through the turbulent flow features in the first direction to divide the plurality of turbulent flow features into a first sub-set of turbulent flow portions on one side of the trench and a second sub-set of turbulent flow portions spaced from the first sub-set of turbulent flow portions in a second direction and located on an opposite side of the trench,
a plurality of ribs extending outwardly from the internal wall surface, and wherein the turbulent flow features extend from one rib toward an adjacent rib in the second direction, and
a plurality of cooling holes formed within the trench between the first and second sub-sets of turbulent flow portions in the second direction such that the cooling holes do not overlap with the turbulent flow features.

13. The gas turbine engine according to claim 12 wherein the component comprises an airfoil or blade outer air seal, and wherein the at least one internal cooling channel comprises a plurality of internal cooling channels that are each defined by a respective internal surface, and wherein the internal surface of one of the internal cooling channels includes the plurality of ribs, the first and second sub-sets of turbulent flow portions, the at least one trench, and the plurality of cooling holes.

14. The gas turbine engine according to claim 12 wherein each cooling hole is spaced apart from the plurality of turbulent flow features, and wherein the plurality of ribs comprise a plurality of discrete ribs that are spaced from each other across the internal wall surface, and wherein there is at least one trench between each pair of adjacent discrete ribs that divides the plurality of turbulent flow features into the first and second sub-sets of turbulent flow portions, and wherein each trench includes the cooling holes.

15. The gas turbine engine according to claim 12 wherein the plurality of cooling holes comprise film cooling holes that extend to a surface of the gas turbine engine component.

16. The gas turbine engine according to claim 12 wherein the plurality of turbulent flow features comprise trip strips, and wherein the trip strips extend in the second direction between the ribs formed on the internal wall surface.

17. The gas turbine engine according to claim 12 wherein the first sub-set of turbulent flow portions extend to a first set of distal ends and the second sub-set of flow feature portions extend to a second set of distal ends, and wherein the cooling holes are positioned within the trench between the first and second sets of distal ends.

18. The gas turbine engine according to claim 17 wherein the at least one trench is positioned closer to one of the first and second ribs in the second direction than the other of the first and second ribs.

19. The gas turbine engine according to claim 12 wherein the plurality of ribs includes at least a first rib and a second rib, and wherein the turbulent flow features extend between the first and second ribs formed on the internal wall surface, and wherein the at least one trench comprises at least first and second trenches that divide the turbulent flow features into the first sub-set of turbulent flow portions on one side of the first trench, the second sub-set of turbulent flow portions positioned on an opposite side of the first trench and between the first and second trenches, and a third sub-set of turbulent flow portions positioned on one side of the second trench opposite from the second sub-set of turbulent flow portions, and wherein the cooling holes are positioned within the first and second trenches such that the cooling holes do not overlap the first, second, and third sub-sets of turbulent flow portions.

20. The gas turbine engine according to claim 12 wherein the plurality of turbulent flow features comprise sets of turbulent flow features with each set including the first sub-set of turbulent flow portions and the second sub-set of turbulent flow portions, and wherein the ribs extend outwardly from the internal wall surface between adjacent sets of turbulent flow features.

21. A method of forming a cooling circuit for a gas turbine engine component comprising the steps of:
(a) forming at least one internal cooling channel within the gas turbine engine component, the internal cooling channel directing cooling flow in a desired direction and being defined by an internal wall surface;
(b) forming a plurality of turbulent flow features to extend outwardly from the internal wall surface, each turbulent flow feature being spaced apart from an adjacent turbulent flow feature in a first direction;
(c) forming at least one trench to extend through the turbulent flow features in the first direction to divide the plurality of turbulent flow features into a first sub-set of turbulent flow portions on one side of the trench and a second sub-set of turbulent flow portions spaced from the first sub-set of turbulent flow portions in a second direction and located on an opposite side of the trench;
(d) forming a plurality of ribs to extend outwardly from the internal wall surface, wherein the turbulent flow features extend from one rib toward an adjacent rib in the second direction; and
(e) forming a plurality of cooling holes within the trench between the first and second sub-sets of turbulent flow portions in the second direction such that the cooling holes do not overlap with the turbulent flow features.

22. The method according to claim 21 wherein steps (a)-(c) are performed using a casting process.

23. The method according to claim 21 wherein step (d) is performed by a drilling process.

24. The method according to claim 21 wherein steps (a)-(c) are performed using a casting process and step (d) is performed by a drilling process.

25. The method according to claim 21 wherein the gas turbine engine component comprises an airfoil or blade outer air seal, and wherein the plurality of ribs comprise a plurality of discrete ribs that are spaced from each other across the internal wall surface, and wherein there is at least one trench between each pair of adjacent discrete ribs that divides the plurality of turbulent flow features into the first and second sub-sets of turbulent flow portions, and wherein each trench includes the cooling holes.

26. The method according to claim 21 wherein the first sub-set of turbulent flow portions extend to a first set of distal ends and the second sub-set of flow feature portions extend to a second set of distal ends, and including positioning the cooling holes between the first and second sets of distal ends and spaced apart from the first and second sub-sets of turbulent flow portions.

27. The method according to claim 21 including forming the turbulent flow features as trips strips that extend from the first rib toward the second rib, and wherein the trips strips are only interrupted by the at least one trench.

28. The method according to claim 21 including forming the at least one trench to be closer to one of the first and second ribs in the second direction than the other of the first and second ribs.

* * * * *